Oct. 19, 1971    L. T. DOCKER    3,613,196
APPLICATION OF VENTILATORS AND SIMILAR
FITTINGS TO ARTICLES OF UPHOLSTERY
Filed Sept. 11, 1969    7 Sheets-Sheet 1
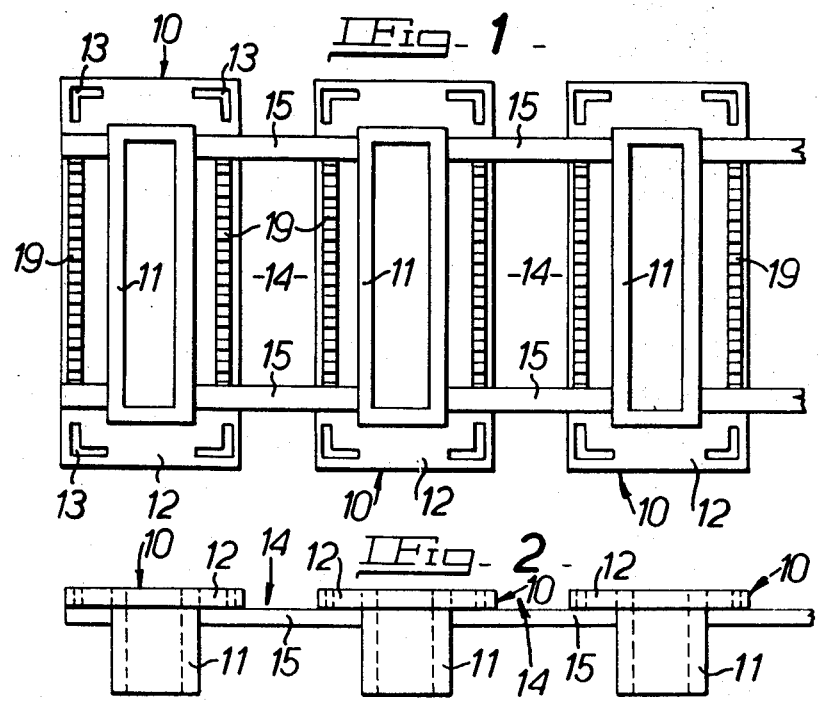
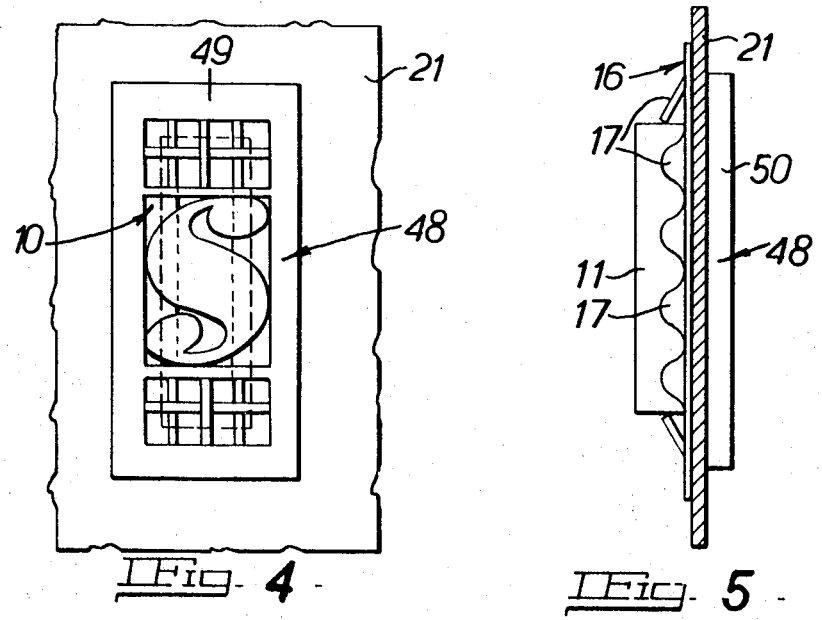

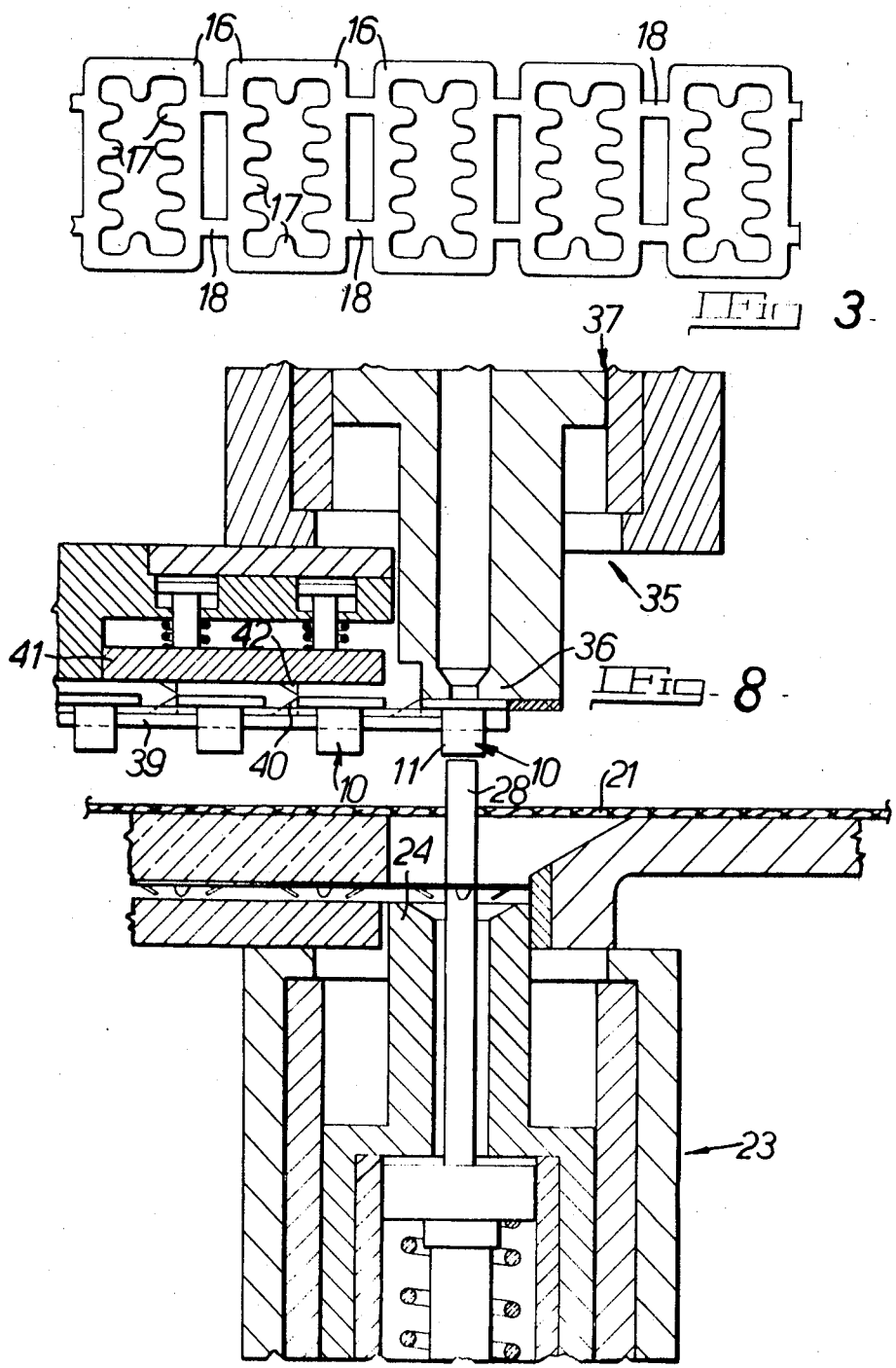

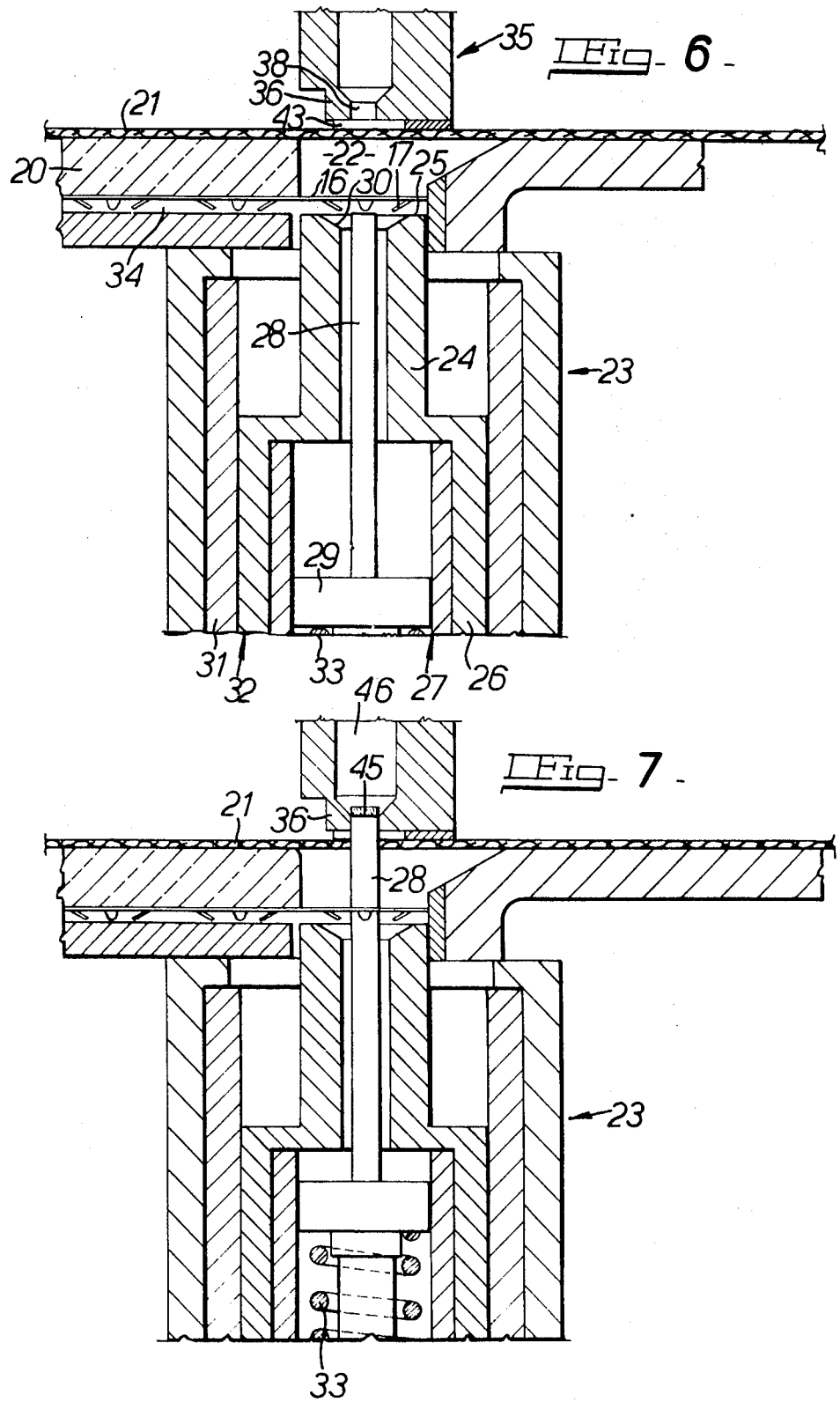

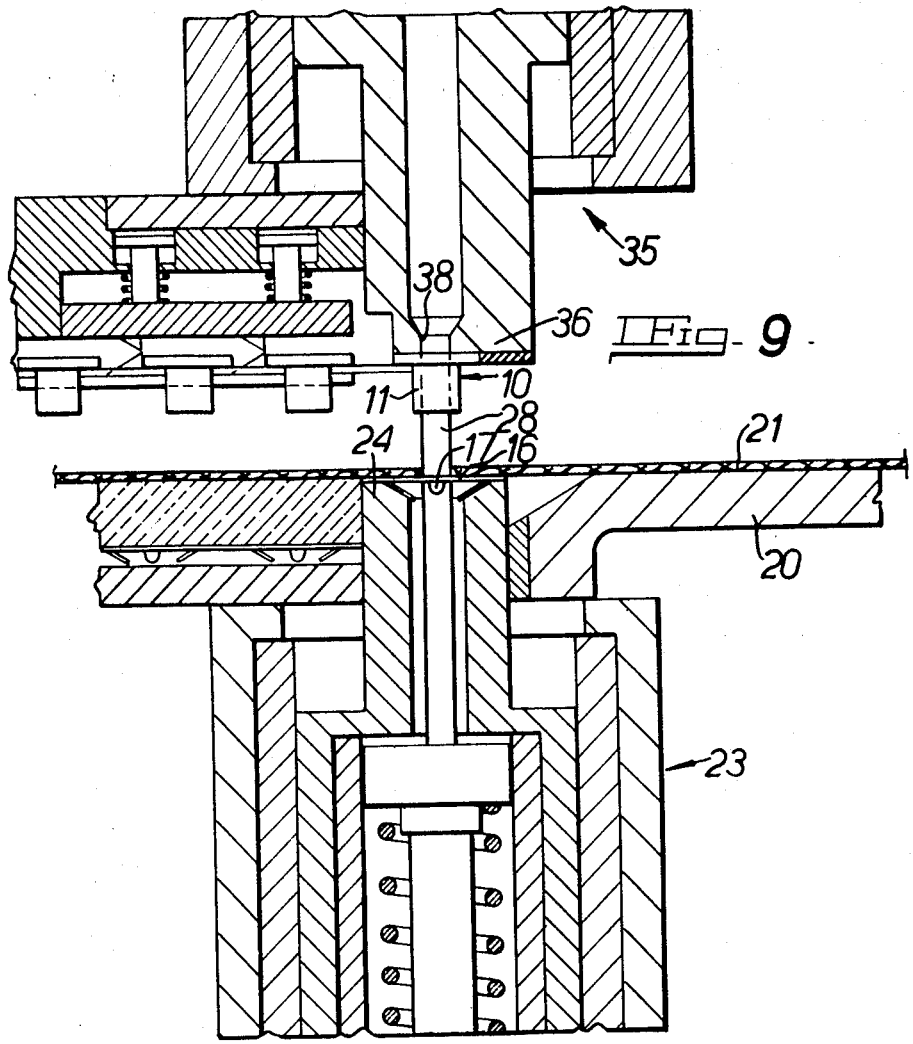

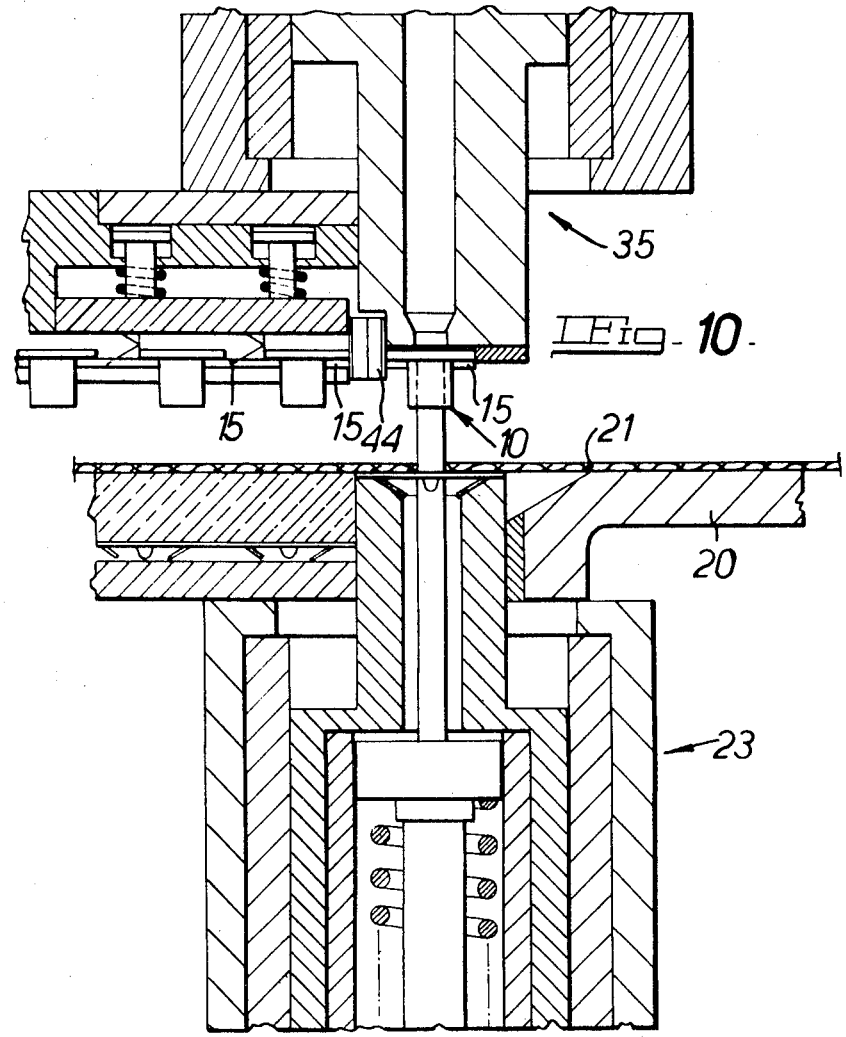

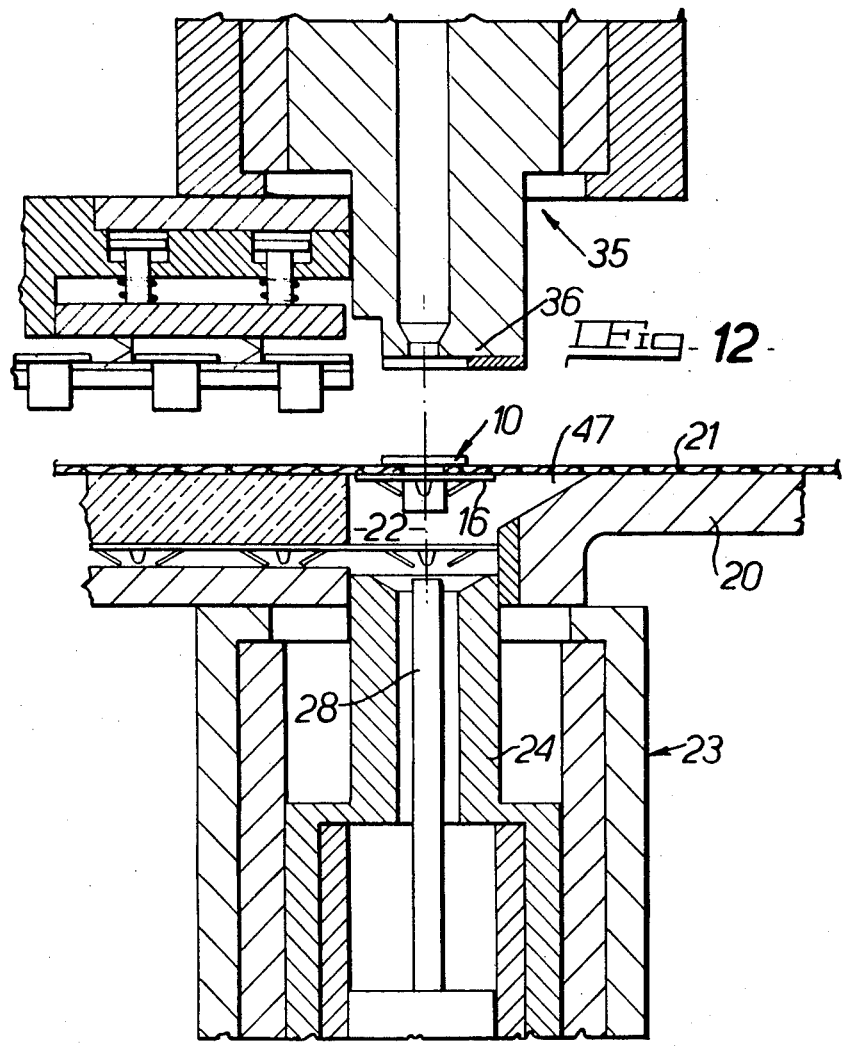

United States Patent Office 3,613,196
Patented Oct. 19, 1971

3,613,196
APPLICATION OF VENTILATORS AND SIMILAR FITTINGS TO ARTICLES OF UPHOLSTERY
Leslie Thomas Docker, Chadwick End, England, assignor to Slumberland Group Limited, Tyseley, Birmingham, England
Filed Sept. 11, 1969, Ser. No. 857,100
Claims priority, application Great Britain, Sept. 11, 1968, 43,126/68
Int. Cl. B68g 7/12
U.S. Cl. 29—91
8 Claims

ABSTRACT OF THE DISCLOSURE

The invention is concerned with the mounting of ventilators and other fittings, such as handle anchorages, on mattresses and other articles of upholstery. Known fittings and retaining washers are employed. Each fitting has a neck which extends through a hold in the article and a head which lies on one side of the article. Each retaining washer comprises a plate with an aperture for the neck of the associated fitting and tongues which allow the neck to be pushed into the aperture but strongly resist its withdrawal. The invention provides bands of fittings and bands of retaining washers, and apparatus which severs a fitting and a washer from the bands, guides them to opposite sides of the article, passes the neck of the fitting through a preformed hole in the article and into the aperture in the retaining washer.

---

This invention is concerned with improvements in and relating to the provision of ventilators and similar fittings to articles of upholstery. The invention has been developed in connection with the application of ventilators to the borders of mattresses but it is to be understood that it is also applicable to the application of other fittings to mattresses, such as supports for handles, and is also applicable to the application of ventilators and similar fittings to other articles of upholstery such as cushions, seat squabs and seat backs.

The fittings with which the invention is concerned are of a known kind (hereinafter referred to as the kind specified) comprising a neck, which in use extends through a hole in an article of upholstery, and an outwardly extending head which in use lies on one side of the article. Such fittings are retained in place by retaining washers of a known kind (hereinafter referred to as the kind specified) comprising a plate with an aperture for receiving that end of the neck of the fitting further from the head, and at least one tongue at the side of the aperture, which tongue or each of which tongues allows the neck to be pushed into the aperture but engages the side of the neck so as strongly to resist withdrawal of the neck.

It is known to form a hole in a mattress border and to insert the neck of a ventilator fitting of the kind specified through the hole and through the aperture of an appropriate retaining washer of the kind specified. The assembly operation is relatively slow, however, as it is necessary for both the fitting and the washer to be handled individually in being brought to the correct positions relatively to the border prior to assembly. An aim of the invention is to overcome or reduce this difficulty.

From one aspect of the present invention there is provided a method of applying a fitting to an article of upholstery and securing it in place with a retaining washer, the fitting comprising a neck with an outwardly extending head, and the retaining washer comprising a plate with an aperture for receiving the neck of the fitting and at least one tongue at the side of the aperture, which tongue allows the neck to be pushed into the aperture but engages the side of the neck so as strongly to resist withdrawal of the neck, which method consists in severing the fitting from a band of similar fittings, severing the retaining washer from a band of similar washers, guiding the severed fitting and washer along predetermined paths to opposite sides of the article of upholstery, and passing the neck of the fitting through a preformed hole in the article of upholstery and into the aperture in the retaining washer.

From another aspect of the invention there is provided apparatus for applying a fitting to an article of upholstery and securing it in place with a retaining washer, the fitting comprising a neck with an outwardly extending head, and the retaining washer comprising a plate with an aperture for receiving the neck of the fitting and at least one tongue at the side of the aperture, which tongue allows the neck to be pushed into the aperture but engages the side of the neck so as strongly to resist withdrawal of the neck, which apparatus comprises means for severing a fitting from a band of similar fittings, means for severing a retaining washer from a band of similar washers, guide means operative to guide the severed fitting and washer along predetermined paths to opposite sides of the article of upholstery and means for pushing the neck of the fitting through a preformed hole in the article of upholstery and into the aperture in the retaining washer.

Although it is within the scope of the invention to provide a retaining washer which has only one tongue it is preferred to provide a retaining washer which has a plurality of tongues.

As indicated above the fittings and washers with which the invention is concerned are of known kinds, but it is new to provide bands of such fittings and washers, and it is these bands which form an essential part of the invention and enable the handling of the fittings and washers to be much simplified, for unless the fittings and washers are provided in the form of bands it is necessary to withdraw individual fittings and washers from accumulations of such parts, to free them from the others and to orientate them correctly.

The invention will now be more particularly described with reference to the accompanying drawings, in which:

FIG. 1 is a rear elevation of one end part of a band of fittings,

FIG. 2 is a side view of the end part of the band shown in FIG. 1,

FIG. 3 is an elevation of one end part of a band of retaining washers,

Figure 11:
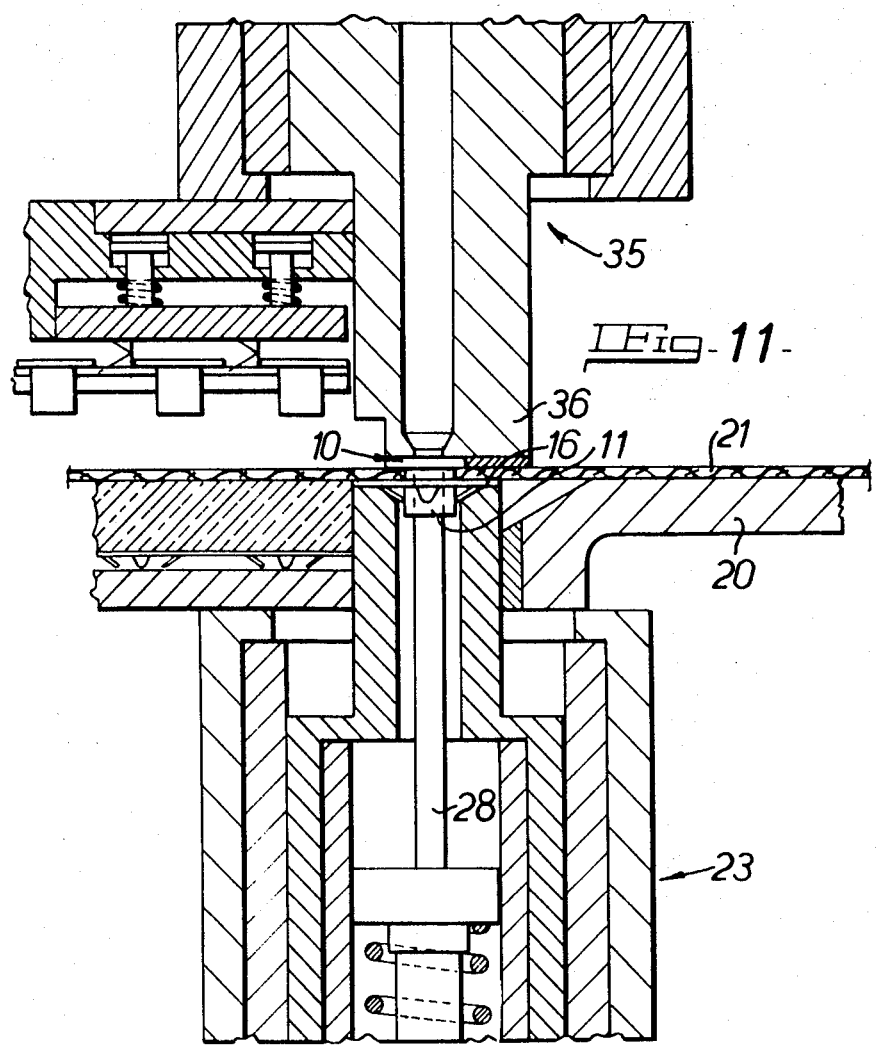

FIG. 4 is an elevation of part of an article of upholstery with a ventilator applied to it, the ventilator incorporating a fitting of the kind shown in FIGS. 1 and 2, a retaining washer of the kind shown in FIG. 3, and a grid, FIG. 5 is a side view of the ventilator shown in FIG. 4, FIG. 6 is a vertical section through apparatus for applying fittings of the kind shown in FIGS. 1 and 2 to articles of upholstery and securing them in place by means of retaining washers of the kind shown in FIG. 3, the apparatus being in the position which it assumes at the beginning of a cycle of operations.

FIG. 7 is a view similar to FIG. 6 but illustrates a subsequent stage in the cycle, and FIGS. 8 to 12 are views similar to those of FIGS. 6 and 7 but including rather more of the apparatus and illustrating successive stages in the cycle.

The band of fittings, part of which is shown in FIGS. 1 and 2, is formed as a unitary moulding from a plastics material such as nylon and may conveniently incorporate about twelve fittings. Each fitting 10 comprises a neck portion 11, in the form of a short length of tube of rectangular shape and of uniform wall thickness, and a head portion in the form of an outwardly directed, planar, rectangular flange 12 of uniform width at one end of the neck 11. Adjacent to each corner of the flange 12 is an L-shaped slot 13, the limbs of the slot being parallel with the adjacent edges of the flange, and the corner of the slot lying close to the adjacent corner of the flange. The purpose of these slots 13 is described below. The fittings 10 in the band are disposed side-by-side in a row with their flanges 12 in a common plane and their tubular necks 11 all extending on the same side of this plane. The longer sides of the rectangular flanges 12 and necks 11 are at right-angles to the length of the row. Each fitting is spaced from the next by a gap 14 which, in the example illustrated is substantially equal in width to the width of the neck 11 of each fitting, or may be of some other suitable width; and each fitting 10 is connected to the next by a pair of spaced, parallel rods 15 lying immediately beneath the flanges 12 and integrally connected both to the flanges and to the opposite end parts of the necks 11. As will be described below those parts of the rods 15 between the flanges 12 of successive fittings 10 are severed and removed during assembly.

The fittings 10 are designed for use with retaining washers 16 severed from a band of similar washers, part of the band being shown in FIG. 3. The band is formed from strip metal and is of indefinite length. Each washer 16 is of rectangular shape in outline with rounded corners. The longer sides of the washers are at right angles to the band. The central part of each washer 16 is pierced so as to leave a rectangular hole with tongues 17 projecting into it. There are ten tongues 17, four along each of the longer sides and one on each of the shorter sides of the hole. Each tongue 17 has a rounded end, and all the tongues are bent at their roots so that they are somewhat inclined to the main plane of the washer 16 on one side of the washer. Each washer is joined to the next by pair of spaced integral links 18 which are severed at the centre when the washers are separated, as described below.

The relative dimensions of the fittings 10 and washers 16 are such that the tubular neck 11 of a fitting 10 can be pushed into the centre hole in a washer 16, against the resistance afforded by the tongues 17, which incline away from the flange 12 of the fitting. Removal of the fitting 10 from the washer 16 is very much more difficult, however, as the tongues 17 bite into the neck 11 of the fitting.

Each of the fittings shown in FIGS. 1 and 2 includes integral teeth 19 on the underside of the flange 12 between the rods 15. When the fitting is assembled with a retaining washer 16 the teeth 19 with the remaining parts of the rods 15 engage one side of the mattress border or other article of upholstery, while the other side is engaged by the retaining washer, the mattress border or other article being trapped between them. In an alternative arrangement which is not illustrated the teeth 19 are omitted and the rods 15 are entirely removed when the fittings are severed. The border or other article is then trapped between the flat underside of the flange 12 and the retaining washer 16.

The apparatus illustrated in FIGS. 6 to 12 is intended for use in applying ventilator fittings of the type described above to mattress borders. The apparatus includes a horizontal platform 20 on which a border 21 can be placed, and operative parts above and below the platform. The platform 20 is formed with a rectangular through ber 22 of a size which can just accommodate a retaining washer 16 severed from the band of washers. That part 23 of the apparatus which is below the platform 20 includes two vertically reciprocable punches aligned with the hole 22.

One of these punches 24—the outer punch—fits the rectangular hole 22 and is movable between an upper position (as shown in FIGS. 9 to 11) in which its horizontal top surface 25 is very slightly below the level of the top of the platform 20, and a lower position (as shown in FIGS. 6 to 8 and FIG. 12) in which it is near the lower end of the rectangular hole 22 but is still within the hole. The outer punch 24 is constituted by an upward extension of the upper end of the cylinder 26 of a pneumatic piston-and-cylinder unit 27 disposed with its axis vertical. The other punch, 28—the inner punch—is constituted by an upward extension of the piston 29 of the piston-and-cylinder unit 27 and extends through an axial hole in the outer punch 24. The inner punch 28 is again of rectangular shape in plan, but is smaller than the outer punch 24. The mouth of the hole in the outer punch 24 is flared upwards and outwards as shown at 30 so that when a retaining washer 16 is disposed on it (as shown in FIGS. 9 to 11) with its tongues 17 inclined downwards the tongues lie against the flared surfaces. The size of the inner punch 28 is such that it passes readily between the tongues 17 and can fit into the neck of a fitting 10 as described below. The inner punch 28 is movable between an upper position (as shown in FIGS. 7 to 10) in which it projects above the outer punch 24, and a lower position (as shown in FIG. 6 and FIGS. 11 and 12) in which its upper end is very slightly lower than the top surface 25 of the outer punch 24. The cylinder 26 of the piston-and-cylinder unit 27 is itself mounted for vertical sliding movement in a fixed cylinder 31 and constitutes the piston of a second pneumatic piston-and-cylinder unit 32. Thus, operation of the second unit 32 moves the outer punch 24 and inner punch 28 in unison, while operation of the first unit 27 moves the inner punch 28 relatively to the outer punch 24.

Each of the pistons 29 and 26 of the piston-and-cylinder units 27 and 32 respectively, are urged upwards by springs. The spring 33 of the inner piston 29 is visible in some figures but the spring of the outer piston 26 is below the piston and is not visible in any of the figures. Each piston is moved upwards by its associated spring and is moved downwards by the application of a vacuum to the interior of the associated cylinder below the piston.

A horizontal guide channel 34 in the platform 20 and beneath the top surface thereof issues laterally into the lower part of the rectangular hole 22 in the platform. The arrangement is such that the end of the channel 34 is just uncovered when both punches 24 and 28 are in their lower positions as shown in FIGS. 6 and 12. In use one end of the band of retaining washers 16 is fed through the guide chanel 34, and the end washer of the band enters the rectangular hole 22. When the outer punch 24 is raised the end washer 16 is severed from the band and is carried upwards as described in greater detail below.

The part 35 of the apparatus above the platform 20 includes a die 36 disposed above the rectangular hole 22 and movable by means of a third pneumatic piston-and-cylinder unit 37 (see FIGS. 8 to 12) between an upper position (as shown in FIGS. 6, 7 and 11) in which its lower end is spaced well above the platform 20, and a lower position (as shown in FIGS. 8 to 10 and 12) in which its lower surface is only slightly above the level of the top of the platform 20. The die has a central hole 38 aligned with the inner punch.

To one side of the die 36 is fixed a guide comprising a pair of horizontal, spaced, parallel slides 39 (only one of which is shown) on which rest the ends of the flanges 12 of a band of fittings 10, the necks 11 depending between the slides. The slides 39 are longitudinally reciprocable by means of another pneumatic unit (not shown) and rest on fixed rails (not shown). Each of the slides 39 carries teeth 40 on its upper surface, the teeth being shaped like sawteeth and the arrangement being such that as the slides are moved towards the die 36 the vertical faces of the teeth engage the flanges 12 of the fittings 10 and push the band towards the die, but when they are moved away from the die the inclined faces of the teeth slide beneath the flanges. In order to prevent the reverse movement of the band a spring-loaded plate 41 bears downwards onto the tops of the flanges 12 and carries downwardly projecting saw-teeth 42 which again permit forward movement of the band and prevent reverse movement. For clarity the plate 41 is illustrated in its raised position.

When the die 36 is in its upper position its lower end is aligned with the guide (as shown in FIG. 8). The lower end is formed with a recess 43 of a size which can just receive the flange 12 of a fitting 10 and is open along that side facing the guide. Thus when the band of fittings is fed forwards the flange of the end fitting enters this recess 43. There is a gap between the open side of the recess 43 and the adjacent guide, the width of the gap being equal to the distance between the flanges 12 of adjacent fittings 10 in the band. A pneumatically operated cutter 44 (see FIG. 10) with a V-shaped slot in its leading end is reciprocable in a horizontal direction through this gap, moving in a direction at right angles to the length of the band. The cutter 44 is operative to sever those parts of the rods 15 which lie between the flanges 12 from the flanges and thus to separate the end fitting from the band.

The cycle of operations of the apparatus will now be described. Initially the die 36 is in its upper position, but with no fitting 10 in the recess 43 at its lower end, and the punches 24 and 28 are both in their lower positions. The end washer 16 of the band of washers is inserted into the rectangular hole 22 through the platform 20 above the punches. A length of mattress border 21 is placed on the platform 20 and the die 36 is lowered onto it as shown in FIG. 6. The inner punch 28 is raised and pierces a rectangular hole in the border 21 as shown in FIG. 7. The plug of material 45 severed from the border 21 is pushed upwards into the hole 38 in the die 36, and the upper part 46 of this hole 38 is of enlarged cross-section so that it forms a discharge passage for the plugs. The die 36 is next raised, and the band of fittings fed forward as shown in FIG. 8. The arrangement is such that the lower end of the neck 11 of fitting 10 which enters the recess 43 at the bottom of the die 36 just clears the upper end of the lower punch 28. The outer punch 24 is then raised, and severs the washer 16 from its band and carries it upwards into contact with the underside of the border 21 as shown in FIG. 9. Upward movement of the outer punch 24 also raises the inner punch 28, and this now extends through the neck 11 of the fitting 10 below the die 36 and enters the hole 38 in the die. The cutter 44 severs the end fitting 10 from the band as described above and as shown in FIG. 10. The die 36 is then lowered again as shown in FIG. 11 to carry the fitting 10 down the inner punch 28 so that its neck 11 is forced through the hole in the border 21 and between the tongues 17 of the washer 16. The body of the inner punch 28 thus acts as a guide bar for the fitting 10 and causes the fitting to follow a predetermined path from the place where it is severed from the band of fittings to the mattress border 21. Similarly the body of the inner punch also acts as a guide bar for the retaining washer 16 and assists in guiding it from the place where it is severed from the band of washers to the mattress border. It may be noted here that the hole cut in the border 21 by the punch 28 is only equal in size to the bore of the neck 11, but it is found that the relatively thin-walled neck can readily be forced through the hole. Finally the die 36 is raised, as shown in FIG. 12, and the punches 24 and 28 are both lowered leaving the fitting 10 in place on the border 21 and the apparatus ready for the next cycle of operation.

That side of the mouth of the rectangular hole 22 in the platform 20 which is further from the ends of the bands is chamfered as indicated at 47 so that if the border 21 is pulled in a direction away from the bands the assembled fitting 10 and washer 16 engages the inclined face and is lifted from the hole 22.

In a convenient arrangement the band of washers 16 is coiled and mounted on a suitable spindle (not shown) below the platform 21.

The sequence of operation of the pneumatic units in the apparatus is preferably controlled automatically so that the completion of each movement trips a valve which initiates the next movement, the operator only starting the cycle. In a modified arrangement the border 21 may be advanced automatically through a predetermined distance, after each cycle is completed, and a further cycle automatically started. As ventilators are usually disposed at non-uniform spacings along a mattress border the means for advancing the border is preferably such that any desired sequence of advancing movements can be selected.

Each ventilator may be finished by having a grid applied to it. The grid 48, shown in FIG. 4, comprises a moulding from a suitable plastics material which may be metal-plated or otherwise decoratively finished. The grid 48 has a rectangular border 49 and a peripheral depending flange 50 (FIG. 5) which surrounds the flange 12 on the fitting 10. Near its corners the grid has L-shaped spigots which fit into the L-shaped slots 13 in the flange 12 of the fitting 10. The grid 48 is adhesively secured in place. The grid may include a letter such as the S illustrated, or a symbol or monogram indicative of the manufacturer of the mattress.

Although the fitting described above is primarily intended for use as a ventilator it may also be used as one of a pair of similar anchorages for the ends of a handle. The handle may have barb-like tongues at its ends such that the ends can be pushed through the fittings but cannot be withdrawn. The grids are, of course, omitted when the fittings are used for this purpose.

Although the invention has been described in relation to ventilators or like fittings of rectangular shape which are in use retained by rectangular washers it is to be understood that fittings and washers of other shapes may be used; in particular the fittings may be circular and may engage circular washers. In such cases the apparatus for applying the fittings is modified accordingly, the hole 22 being circular, and the punches 24 and 28, and the recess 43 and hole 38 also being circular.

What I claim is:

1. A method of applying a fitting to an article of upholstery and securing it in place with a retaining washer, the fitting comprising a neck with an outwardly extending head, and the retaining washer comprising a plate with an aperture for receiving the neck of the fitting and at least one tongue at the side of the aperture, which tongue allows the neck to be pushed into the aperture but engages the side of the neck so as strongly to resist withdrawal of the neck, which method consists in severing the fitting from a band of similar fittings, severing the retaining washer from a band of similar washers, guiding the severed fitting and washer along predetermined paths to opposite sides of the article of upholstery, and passing the neck of the fitting through a preformed hole in the article of upholstery and into the aperture in the retaining washer.

2. Apparatus for applying a fitting to an article of upholstery and securing it in place with a retaining washer, the fitting comprising a neck with an outwardly extending head, and the retaining washer comprising a plate with an aperture for receiving the neck of the fitting and at least one tongue at the side of the aperture, which tongue allows the neck to be pushed into the aperture but engages the side of the neck so as strongly to resist withdrawal of the neck, which apparatus, comprises means for severing a fitting from a band of similar fittings, means for severing a retaining washer from a band of similar washers, guide means operative to guide the severed fitting and washer along predetermined paths to opposite sides of the article of upholstery, and means for pushing the neck of the fitting through a preformed hole in the article of upholstery and into the aperture in the retaining washer.

3. Apparatus according to claim 2 in which the guide means comprises a bar which is operative to extend through the hole in the article of upholstery through the aperture in the retaining washer and through the neck of the fitting which is tubular.

4. Apparatus according to claim 3 in which the bar is also operative as a punch to form the hole in the article of upholstery.

5. Apparatus according to claim 4 in which the bar, when acting as a punch, co-operates with a die which also serves to support the fitting as it is assembled with the retaining washers.

6. Apparatus according to any of claims 3 to 5 in which the bar extends through an outer punch operative to sever the retaining washer from the band of retaining washers and to move it to the article of upholstery.

7. Apparatus according to claim 6 in which there is piston-and-cylinder means, the piston thereof being operative to move the bar and the cylinder thereof being operative to move the outer punch.

8. Apparatus according to claim 7 in which the cylinder of said piston-and-cylinder means constitutes the piston of second piston-and-cylinder means.

References Cited
UNITED STATES PATENTS

| | | | |
|---|---|---|---|
| 2,312,379 | 3/1943 | Bechik | 5—347 |
| 2,359,193 | 9/1944 | Bechik | 5—345 B |
| 3,447,229 | 6/1969 | Clark | 29—525 X |
| 3,491,183 | 1/1970 | Brow | 29—525 X |

FRANK T. YOST, Primary Examiner

U.S. Cl. X.R.

5—347; 29—91.1, 200 R, 252, 525